Jan. 28, 1958 H. C. DUNEGAN 2,821,490

TITANATE RECTIFIERS

Filed March 11, 1953

INVENTOR
HARRY C. DUNEGAN
BY
F. Kumpf
ATTORNEY

United States Patent Office 2,821,490

Patented Jan. 28, 1958

2,821,490

TITANATE RECTIFIERS

Harry C. Dunegan, Mineola, N. Y., assignor to Sylvania Electric Products Inc., a corporation of Massachusetts Application March 11, 1953, Serial No. 341,790

1 Claim. (Cl. 117—200)

This invention deals with crystal rectifiers of the point contact or area contact type. More particularly, it relates to a group of novel compositions consisting primarily of lanthanum doped alkaline earth titanates or mixtures thereof in a reduced state which are effective as crystal rectifiers.

A crystal rectifier is a non-linear device which has the property of transforming alternating current into direct current and is capable of handling fairly broad frequencies of alternation of the source current. Such crystal rectifiers depend for their action for the most part on the presence of regional areas generally at the surface through which current is conducted more readily in one direction than in the other direction. Such regions or areas have been designated as barrier layers. These barrier layers are thin and their effectiveness may be designated by the fact that normally the resistances in non-conducting direction may be several thousand times higher than the resistance in the conducting direction.

Two fairly standard means have been developed for using such rectifiers. The first involves application of an extremely fine point. A major function of the use of such point contact is miniaturization and reduction of electrostatic capacity. Under these conditions the crystal rectifier is suitable for high frequency purposes and is used as a detector in the micro-wave region as a substitute for a vacuum tube. As a matter of fact point contact crystal rectifiers were very common devices in the early history of radio communication and detectors. They fell into obscurity with the development of the vacuum tube and again became quite important in later years with the expansion of communications to high frequency and micro-wave regions. The area type rectifier is most useful for power conversion purposes in which the transfer of massive amounts of A. C. power into comparable D. C. power is desired. When made in large banks such fixed rectifiers are efficient substitutes for motor generator sets.

In the early days the most common crystal rectifier was gelina and as indicated an important component in such early radio receivers was a piece of gelina and its attendant cat whisker. More recently, germanium and silicon have emerged as important crystal rectifier materials for the point contact construction. Materials most usefor for power conversion purposes are selenium, copper oxide and magnesium sulfide.

Germanium and silicon point contact rectifiers suffer from several disadvantages. Germanium is an expensive material and must be very carefully processed in order to obtain the best results. While the resistance ratios are high and the voltage of operation are correspondingly high the carrying capacity is relatively low. In view of the method of preparation of both silicon and germanium the materials are inherently expensive. In the case of both selenium and copper oxide the most common type of plate or area type rectifying materials the voltage carrying capacity is relatively low or in terms of the electrical engineer the back voltage does not exceed 50 to 60 volts per cell.

The general field of crystal rectifiers is an exceptionally important one in electrical engineering and in communications.

It is an object of this invention to develop a group of crystal rectifier materials which are useful both as point contacts and area type rectifiers.

It is another object of this invention to develop materials which are relatively inexpensive and which may be processed by simple means to make them useful both as point contact and area type rectifiers.

It is a still further object of this invention to develop crystal rectifiers which under proper operating conditions will stand exceptionally high operating voltages and high operating currents so that when properly used they exhibit advantages over existing fixed rectifying devices.

In accordance with our invention these and other advantages which are incidental to their application can be obtained with reduced titanates of the alkaline earth metals which have been doped with lanthanum particularly the titanates of barium, strontium, calcium or mixtures of barium, strontium and calcium when these titanates are made effective for rectifying purposes by ceramic procedures.

In the accompanying drawings which illustrate preferred forms of devices embodying features of this invention Figure 1 is a perspective view partly in section showing the disc of a reduced titanate of an alkaline earth metal doped with lanthanum having a conductive coating on one surface and an oxidized film on the other.

When fired in an oxidizing atmosphere through vitrification the titanates are first class insulators having resistivities of the order of thousands of megohm centimeters. It has been found that when these titanates are fired in a strongly reducing atmosphere through vitrification the resistivities are of the order of ohm centimeters and the fully reduced material exhibits non-linear characteristics. If a barrier layer is then formed by superficial oxidation of the surface the system functions as an efficient rectifier.

Figure 1:
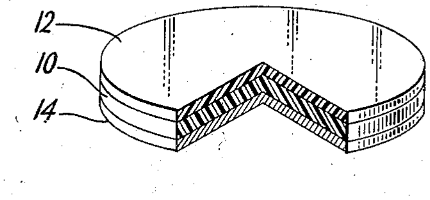

In Figure 1 of the drawings 10 represents a reduced titanate of an alkaline earth metal doped with lanthanum, 12 represents an oxide coating on the top surface of the reduced titanate and 14 represents electrical conducting coating. Additional layer 16 shown in Figure 2 as superimposed on layer 12 represents a counter-electrode material which may preferably be made of a soft metal such as lead or cadmium.

The general method of preparation involves formation of a part or sheet by compression of the powder. The formed pellet is then fired in a clean dry inert or reducing atmosphere at temperatures on the order of 2000 to 2600° F. and then permitted to cool in such clean atmosphere. The surface of the pellet may be superficially oxidized by any number of methods. For example, (*a*) a high temperature treatment with a mixture of hydrogen and water vapor, (*b*) a medium temperature treatment in oxygen or air for a few moments, (*c*) by oxidizing electrolytically in a specified solution at room temperature in which the titanate material is the anode in the electrolytic bath. The surface may also be advantageously given a lead oxide coating.

Figure 2:
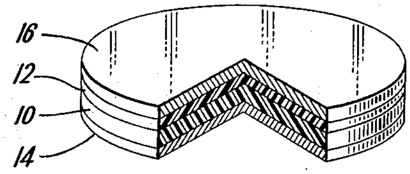
Figure 2 is a perspective view partly in section of an area type rectifier of this invention.
Figure 3:
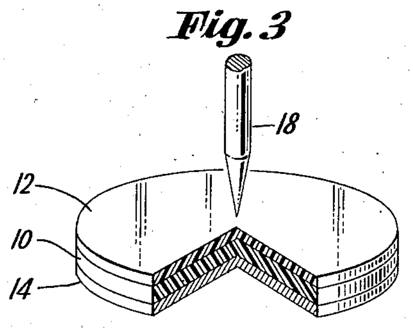
Figure 3 is a perspective view partly in section of a point type rectifier of this invention.

A variety of counter-electrodes is suitable for developing the most useful properties but of these it has been found that relatively soft blunt points are most effective and such points are made of lead or combinations of tin, lead or cadmium. These metals may be in the form of a point 18 as shown in Figure 3 in which a considerable pressure of contact is used or as an area covering the entire effective surface of the reduced and superficially oxidized titanate pellet as shown in Figure 2. Such contact electrodes become effective under the application of rather heavy pressure.

Specifically the method of preparation of these various rectifying materials is subject to a number of preferred variations which will be described in detail. Titanates of calcium, strontium and barium in their mixtures with one another are available commercially in the form of fully reactive ceramic powders having a particle size in the range of 3 to 10 microns. These after being doped with lanthanum are formed into shape from a mixture consisting of 100 parts of the doped powder titanates and ten parts of a 15% solution of polyvinyl alcohol. Other tempering agents such as ethyl cellulose in the form of a 2% solution may conveniently be used in cases where the organic material creates a problem with respect to maintaining reasonably clean furnace atmosphere water alone is suitable. The advantage of such agents as polyvinyl alcohol and methyl cellulose is to provide sufficient strength so that the clean pieces may be handled without fear of breaking prior to their insertion into the furnace. The pellets are then pressed with pressures of the order of 4000 to 8000 lbs. per square inch. After being dried at room temperature for a period of 24 hours they are placed in saggers whose interior is lined with a smooth surface of powdered barium zirconate. The function of the barium zirconate is to prevent reaction between the titanate material and the sagger material at the elevated temperatures to which the devices are fired. The pieces are then fired in a furnace having reducing atmospheres at temperatures on the order of 2000 to 2600° F. and are maintained at this top temperature for a period of three hours. Clean pure hydrogen or mixtures of helium and hydrogen may be used.

Lanthanum in amounts up to 5% have been used successfully in doping the titanates. Amounts on which most of the work to date has been done is, however, in the neighborhood of 1%. It has, however, been found that as the lanthanum addition is increased it is possible to increase the ratio of He to $H_2$ in which the material is fired and the more nearly the pellets come to containing 0% lanthanum the closer to 100% $H_2$ is needed in the furnace atmosphere. The use of He in ratios of 8 to 1 of $H_2$ is possible with 3% of lanthanum. This is very desirable since it cuts down on the amount of water vapor formed and also reduces the normal hazards of working with a $H_2$ furnace.

In those cases where its helium content is low and relatively pure hydrogen is used at a high rate of flow no special precautions are needed to insure that the water vapor which is the product of reduction between the hydrogen and titanates is removed from the furnace. When relatively low rates of flow are used, that is, in amounts less than 1000 cc. per minute then a special precaution is necessary to make certain that the water formed as a product of the reaction does not contaminate pellets which are downstream in the reaction vessel. Under these conditions the pellets are separated from each other by small amounts of titanium hydride which acts as an effective getter for oxygen or water vapor and does not permit such contaminants to be effective in later portions of the firing operation. One of the advantages of using the hydrogen helium atmosphere under the conditions just described is that the water vapor formed is negligible.

The firing is normally continued until it is in a completely non-porous condition, that is vitrification is obtained and the pieces are then allowed to cool to room temperature in the presence of controlled atmosphere. As indicated previously the superficial oxidation or formation of the barrier layer may be accomplished in any number of ways. The pellet may be refired in a mixture of hydrogen and water vapor at a temperature close to the vitrification point. A more convenient procedure is to fire the pellet in air or in oxygen for a few minutes at temperatures at the order of 1500 to 1700° F. Generally a treatment of 10 to 15 minutes is sufficient. The higher the temperature the shorter the time required.

This oxide coating may also be applied to the titanate body electrolytically. In this case, a variety of electrolytes are suitable such as dilute phosphoric acid, dilute sulfuric acid, dilute boric acid, dilute NaOH and of these, a 5% solution of phosphoric acid or ammonium acid phosphate is preferred. In this case, the pellet is placed at the bottom of a tube with only the top surface exposed to the electrolytic action and contact is made to the backside which is previously coated with a silver electrode made by painting on a dispersion of metallic silver in an air drying air base. The course of the oxidation proceeds somewhat as follows: When the electrolysis starts, a relatively high current of the order of a fraction of one ampere is passed by the cell and as the barrier layer forms, the amount of current which passes drops precipitously to milliamperes or in some cases even to microamperes. Generally speaking, the higher the current used in forming the barrier layer the more efficient the barrier layer is from the point of view of the amount of voltage it will withstand. In general, the electrolytic oxidation is continued until no further perceptible drop in the current passage through the film may be observed. The pellet is then removed from the electrolytic bath and thoroughly washed in running water and allowed to dry. The contact is made to the surface through a dull point of lead or tin lead solder or through a plate of solder.

A barrier layer which has been found to be even more effective than any of the oxidized surfaces described above is one which can be formed by applying a thin coating of lead oxide to the surface. This oxide coating can naturally be applied in several ways. The one which has been found to be most easily applicable is one in which the oxide coating is applied electrolytically. This coating is applied from an electrolytic solution which can be made by mixing together 300 grams of lead nitrate, 1000 cc. of water and 5 cc. of concentrated nitric acid. When this solution is used for the electrodepositing of the lead oxide on the titanate surface the electrolysis is carried for three minutes at 20 ma. current per square centimeter. The deposit formed is a reddish brown to brownish black deposit and is about .005" thick. The titanate is then removed from the electrolytic bath, thoroughly washed in running water and allowed to dry.

When this material is used as a rectifier the contact can be made through the barrier layer by means of a dull point of soft material such as lead or tin when the rectifier is to be used as a point contact rectifier or the counter electrode may be formed on top of the barrier surface through a plate of solder, cadmium or similar metal.

Under proper conditions breakdown voltages as high as 65–70 volts can be obtained before breakdown while forward currents of the order of 300–400 ma. can be obtained at 2–4 volts. At resistances of about 2 ohms the efficiency of this rectifier has been found to be approximately 75%.

*Example*

To 100 parts of a mixture containing 35.38% $TiO_2$ and 64.2% of $SrCO_3$ is added 2.34 parts of $LaNO_3$ and 100 parts of water. This mixture is then ball milled. To the ball milled mixture is added 1.6 parts by weight of ammonia carbonate plus 40 parts of water which is then further ball milled, dried and pulverized. The pulverized material is to be fired at 1050° C. for four hours after which it is again pulverized whereupon 3% of magnesium stearate and 1% polyvinyl alcohol is added to 100 parts of the product after which 140 parts of water is added and the entire mixture is again ball milled, dried and pulverized after which the product is pressed into the desired shapes at pressures in the order of 8000 lbs. per square inch and fired at temperatures ranging from 2000 to 2700° F. This material is fired in an eight to one volume ratio of helium to hydrogen in the furnace. One surface of the material so obtained is coated with the lead oxide coating by electrolytically depositing the lead oxide thereon from a lead nitrate bath prepared by mixing 300 grams of lead nitrate, 1000 cc. of water and 55 cc. of concentrated nitric acid. The current used during the deposition is 20 ma. per square centimeter, for a period of three minutes. The coating so obtained will have a thickness of approximately .005″. The coated product so obtained can readily be used as a rectifier material by the use of either a point contact or barrier type counter-electrode in contact with the lead oxide coating.

While the above description and drawings submitted herewith disclose a preferred and practical embodiment of the lead oxide coated titanate rectifier of this invention it will be understood that the specific details of construction and arrangement of parts as shown and described are by way of illustration and are not to be construed as limiting the scope of the invention.

What is claimed is:

In the manufacture of a rectifying device, the steps including preparing a ceramic body consisting essentially of partially reduced alkaline earth titanates in admixture with approximately three percent by weight of lanthanum, firing said body in a reducing atmosphere containing helium and hydrogen in the ratio of approximately eight to one at a temperature of the order of 2000° F. to 2600° F. to render said body semiconductive, superficially oxidizing a surface of said body, and applying a metallic contact to said surface.

References Cited in the file of this patent

UNITED STATES PATENTS

| | | |
|---|---|---|
| 1,924,300 | Atherton | Aug. 29, 1933 |
| 1,932,067 | Duhme | Oct. 24, 1933 |
| 2,602,763 | Scaff et al. | July 8, 1952 |
| 2,633,543 | Howatt | Mar. 31, 1953 |
| 2,695,380 | Mayer et al. | Nov. 23, 1954 |
| 2,711,496 | Ruben | June 21, 1955 |

OTHER REFERENCES

Henisch: Electronic Engineering, Oct. 1946, pp. 313–315.

Hausner: Journal of the American Ceramic Society—vol. 30 (1947), pp. 290–296.

Verwey et al.—Philips Research Reports, 5, (1950).